United States Patent [19]

Philibert

[11] 4,120,679

[45] Oct. 17, 1978

[54] PRODUCTION OF SEMI-REFLECTING GLASS PRODUCTS

[75] Inventor: Daniel Philibert, Louveciennes, France

[73] Assignee: Saint-Gobain Industries, Neuilly-sur-Seine, France

[21] Appl. No.: 806,666

[22] Filed: Jun. 15, 1977

[30] Foreign Application Priority Data

Jun. 15, 1976 [FR] France .................................. 76 18154

[51] Int. Cl.$^2$ ............................................. C03C 17/00
[52] U.S. Cl. .................................... 65/60 B; 427/251; 427/255
[58] Field of Search .................. 65/60 B; 427/251, 255

[56] References Cited

U.S. PATENT DOCUMENTS 3,850,679  12/1977  Sopko et al. ..................... 65/60 B X

FOREIGN PATENT DOCUMENTS 1,548,371  12/1968  France ...................................... 65/60 B Primary Examiner—Robert L. Lindsay, Jr.
Attorney, Agent, or Firm—Pennie & Edmonds

[57] ABSTRACT

This invention relates to the process of producing semi-reflecting glass products comprising applying to at least a portion of one surface of said product a solution of at least one charge-transfer complex in a non-aqueous organic solvent therefor, said product having been heated prior to said application to a temperature sufficient to evaporate said solvent and cause pyrolysis of said charge-transfer complex, and said charge-transfer complex having the general formula $MeX_mY_n$ where Me is a transition element having metallic characteristics, X is at least one beta-diketone ester or alcohol radical having no more than 10 carbon atoms or at least one halogen radical, Y is at least one beta-diketone radical having no more than 10 carbon atoms and differing from X, and $m$ and $n$ equal the valence of Me.

11 Claims, No Drawings

PRODUCTION OF SEMI-REFLECTING GLASS PRODUCTS

BACKGROUND OF THE INVENTION

Although many methods of applying these organic metal compounds to the glass to form the metal oxide layer are known, spraying, after the dissolution thereof in a solvent, preferably an organic solvent, is the most widely used method. Indeed, spraying makes it possible to obtain very fine and well calibrated particle sizes and, therefore, a thin and particularly uniform metal oxide deposit.

The solutions are sprayed onto the glass sheets which are still warm from the production line or which have been previously heated to approximately 550° to 640° C. Evaporation of the solvents is, thus, induced as well as a pyrolysis of the metal compounds which, as they decompose, give rise to a layer consisting of at least one metal oxide on the glass. It is possible to deposit in this way the oxides of almost all the plurivalents non noble metals, particularly the metals of Groups IIIB, to VIII and III A to V A of the Periodic Table, advantageously, Ti, V, Cr, Mn, Fe, Co, Ni, Cu, Zn, Al, Si, Zr, Cd, In, Sn, Sb, Bi, Ce, and, more specifically, the oxides of chromium, iron, cobalt, nickel.

Depending on the oxides to be deposited, the most varied mineral or organometallic compounds, tin chloride, tin dibutyllaurate, titanium or zirconium alcoholates, acetyl acetonates of chromium, iron, cobalt, indium, and the like, have been used to the extent that they possess the requisite stability and ease of use, each with its own specific properties, i.e., its own advantages or disadvantages in terms of uniformity, adhesion of the deposits, ease of use, output, and operating costs, and the like.

All types of solvents have been used according to the particular metal compound, either individually, or in a mixture, including aromatics such as benzene, toluene, aliphatics such as heptanes, white spirit, chlorinated solvents (trichloroethylene and dichloromethane), or oxygenated solvents such as ethanol, methanol, isopropanol, ketones and also esters such as ethyl or butyl acetates.

A known method of producing tin oxide conducting layers is that of combining chlorinated and fluorinated compounds with organic tin compounds such as tin dibutyl oxide in the solution used to treat the surface of the glass.

However, the best results to date in the production of conventional semi-reflecting windows seem to have been obtained by the use of beta-diketonates and acetylacetonates.

Benzene, in particular, is often used as a solvent for acetylacetonates which, among the beta-diketonates, comprise the most often used class of complex salts. Benzene dissolves acetylacetonates particularly well, but has serious drawbacks from the standpoint of health hazards owing to its toxicity. The same is true for dichloromethane, which is highly volatile, or trichloroethylene.

Attempts have also been made to replace benzene by other solvents which have fewer drawbacks, but, since acetylacetonates are less soluble in these solvents than in benzene, the quality of the semi-reflecting glass products obtained after spraying and pyrolysis is much lower.

In pursuing the object which consists in trying to replace benzene by a less dangerous solvent, it has also been suggested to use organometallic salts comprising long hydrocarbon chains dissolved in aliphatic solvents as these salts, particularly the higher beta-diketonates, dissolve particularly well in the solvent.

It has, unfortunately, been noted that the increased solubility obtained, for example, in going from a 5 to 10 carbon atom chain, is accompanied by a decrease in the pyrolytic yield owing to the increasing length of the hydrocarbon chain of the organometallic salt.

As an example, the inventor has used $C_8$ beta-diketonates of metals such as titanium (III), vanadium, chromium, iron, cobalt, aluminum, silicon, zirconium, indium, in a heptane solution and copper, zinc, titanium (IV), and indium in ethyl acetate, to effect deposits on glass sheets at approximately 600° C. It was, however, noted that the pyrolytic yield was lower which, taking into account the higher cost of $C_8$ beta-diketonates with respect to acetylacetonates, leads to a higher overall utilization cost. In addition, there was noted, for certain deposits, a less satisfactory adherence to glass.

It was also possible to envisage the use of a mixture: for example, isovaleroylacetonate in large proportions of up to 10 times the initial concentration can be added to a saturated solution of an acetylacetonate in a solvent.

By way of example, chromium isovaleroylacetonate (CrIVA) up to a concentration of 3% of Cr or a total concentration of 3.3% by weight of Cr can be added to a saturated solution (up to 0.3% by weight of Cr) of chromium acetylacetonate (CrAA) in methanol. However, this type of solution has proved of little use as it not only possibly complicates the choice of operating conditions, but, in any event, the two bodies are deposited virtually independently of one another.

In summary, the known state of the art, therefore, leads to the following alternatives for the production of semi-reflecting windows by the spraying of organometallic salts in solution and pyrolysis of these salts:
either in using acetylacetonates dissolved in aromatic or chlorinated solvents which gives a quality product, produced at low cost, but with all the drawbacks associated with the use of these solvents,
or in using organometallic salts with longer hydrocarbon chains which makes it possible to eliminate these drawbacks, but leads to a more costly product and which, in certain cases, shows less adherence although with a greater homogeneity of the deposit.

SUMMARY OF THE INVENTION

The object of the invention is to eliminate these drawbacks of the known art by replacing the above-mentioned organometallic salts with a complex molecule which may be dissolved in aliphatic solvents and which will make it possible to produce, under normal conditions, i.e., by spraying of the solution onto a glass product, such as a window, at a suitable temperature and pyrolysis of said complex molecule, a metal oxide deposit adhering perfectly to its support and showing satisfactory homogeneity at a cost of the same order as that associated with conventional processes using acetylacetonate dissolved in aromatic or chlorinated solvents.

Briefly stated, the present invention comprises applying to at least a portion of one surface of said product a solution of at least one charge-transfer complex in a non-aqueous solvent therefor, said product having been heated prior to said application to a temperature sufficient to evaporate said solvent and cause pyrolysis of said charge-transfer complex and said charge-transfer complex having the general formula $MeX_mY_n$ where Me is a transition metal or metalloid, X is at least one beta-diketone ester or alcohol radical having no more then 10 carbon atoms, and Y is at least one beta-diketone ester or alcohol radical having no more than 10 carbon atoms and different from X; or one of X or Y can be at least one halogen radical. It has to be pointed out that complexes containing at least an alcohol radical will better dissolve in alcohols or those containing an ester radical in esters.

DETAILED DESCRIPTION

The invention will be described in connection with the production of semi-reflecting glass windows, it being understood that it is applicable to other glass products where semi-reflecting characteristics are desired. In addition, the metallic molecules used in the process are defined as charge-transfer complexes although they can also be considered as metal chelates.

In its broadest terms, the invention comprises forming a solution of such complex in a non-aqueous solvent. Said solution is then applied onto a glass sheet, such as a window, previously raised to a temperature which is sufficient to induce evaporation of said solvent and the pyrolysis of said complex. Spraying is the preferred method of application and any of the present apparatus and techniques used for this purpose are suitable.

The particular temperature of the glass sheet, of course, depends on the charge-transfer complex and the solvent used, but it generally ranges from 580° to 640° C. as in the conventional processes.

As to the charge-transfer complex, it must have the general formula $MeX_mY_n$ where Me is a polyvalent heavy metal or metalloid, X is preferably a beta-diketone radical having no more than 10 carbon atoms, Y is preferably a beta-diketone radical having no more than 10 carbon atoms and different from X; one of X or Y can be at least one halogen radical, and $m + n$ is equal to the valence of Me.

The preferred metals are transition metals such as chromium, iron, cobalt, nickel titanium and vanadium, and the metals of Groups $III_A$, $IV_A$ and $V_A$ of the Periodic Table. As to the metalloids, silicon is preferred. The most useful elements considered as a group, are Ti, V, Cr, Mn, Fe, Co, Ni, Cu, Zn, Zr, Cd, Al, In, Sn, Sb, Bi and Ce, as well as Si.

As to the beta-diketones, it is preferred to use at least one acetylacetone radical and at least one isovaleroylacetone radical. In fact, it is preferred X or Y be at least one acetylacetone radical and that the other a $C_6$ to $C_{10}$ beta-diketone radical or radicals. As noted, X or Y can also be a halogen such as chlorine, fluorine, or bromine with fluorine being preferred.

The process which is the object of the invention is based on the fact that the above-mentioned complexes of the type $MeZ_mY_n$ when applied under the conditions indicated for the production of semi-reflecting windows, combine the good pyrolytic characteristics of the acetylacetones of the type MeAA in these aromatic solvents.

The solvent used is a non-aqueous, organic solvent and can be selected from any known aliphatic or aromatic solvents and the solvent can be chlorinated, an alcohol, ester, ketone, or similar type, or combination thereof. Examples of solvents are set forth in Tables I, II, and III below and in the Examples. The most suitable solvent to use can be readily determined for each particular complex by initially testing for solubility. It is, of course, desired not to use solvents that present environmental or toxicity problems.

In addition, the inventor has noted quite unexpectedly that when two distinct charge-transfer complexes of the instant invention each have a low solubility in a solvent, they may become jointly soluble in this same solvent. This unusual and unexpected property illustrated hereinbelow in an example, makes it possible to increase the quantity of acetylacetonate. The result is that when the acetylacetonate content increases, the industrial price decreases, the solubility in aliphatic solvents decreases, but the amount of pyrolysis increases for the molar mass decreases and the non-volatile organic part decreases. For a given solvent showing little toxicity, it is, therefore, possible to thus push back further the limit of solubility.

The following Table I shows this by illustrating the solubility of various charge-transfer complexes of the general formula:

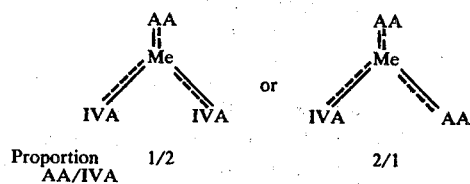

Proportion AA/IVA    1/2         2/1 where IVA denotes the isovaleroylacetone radical and AA denotes the acetylacetone radical. The table also shows the solubility of the mixture which may be considered as a "molecule" of the type 1.5 IVA/1.5AA and of complexes of a metal with IVA or AA alone.

In Table I, Me is, respectively, chromium, iron, and cobalt.

It should be noted, when inspecting these formulas, that the good solubility in organic solvents is obtained as a result of the length of chain IVA, the good pyrolysis being, in turn, obtained as a result of the breaking of the Me-AA bond which initiates the thermal decomposition of the molecule.

In this table, which cites examples of the most important different solvents, a solubility of the complex is considered good as that which has made it possible to introduce a few grams percent of metal sufficient to implement the process. The possibility of using, in numerous cases, a 1.5/1.5 complex, for example, demonstrates that the solubility conferred by the ½ molecules to the 2/1 molecule is increased.

TABLE I

| Proportion of Radicals AA/IVA | Metal | Solvents |
|---|---|---|
| 3/0 | Cr | Poor solubility expect in benzene and dichloromethane |
|  | Fe | Poor solubility except in benzene and chloroform |
|  | Co | Very poor solubility expect in carbon tetrachloride |
| 2/1 | Cr | Acetone, ethyl acetate (precipitation with time) |
|  | Fe | Poor solubility |
|  | Co | Slightly soluble; toluene is the best solvent |
| 1.5/1.5 | Cr | Methanol, ethanol, diacetone alcohol, acetone, ethyl acetate and the like |
|  | Fe | Ethanol, acetone, ethyl acetate |

TABLE I-continued

| Proportion of Radicals AA/IVA | Metal | Solvents |
|---|---|---|
| | | (precipitation with time) |
| | Co | Toluene, ethanol, isopropanol, acetone, methylethyl ketone, ethyl acetate |
| | Cr | Xylene, ethanol, acetone, methylethyl ketone, methylisobutyl ketone, ethyl acetate and the like |
| 1/2 | Fe | Ethanol, butylglycol, acetone |
| | Co | Toluene, ethanol, isopropanol, acetone methylethyl ketone, methylisobutyl ketone, ethyl acetate |
| | Cr | White spirit, heptane, benzene, toluene, methanol, ethanol, isopropanol, acetone, methylethyl ketone, ethyl acetate and the like |
| 0/3 | Fe | Heptane, ethanol, butylglycol, acetone, ethyl acetate and the like |
| | Co | Heptane, toluene, ethanol, isopropanol, acetone, methylethyl ketone, ethyl acetate and the like |

The charge-transfer complexes of the present invention can be prepared by any of the known procedures by using, for example, distilled acetylacetone and a $C_6$ to $C_{10}$ beta-diketone, such as isovaleroylacetone in excess with respect to a metal salt such as $FeCl_3$, $CrCl_3$, $Cr(NO_3)_3$, $CoCl_2$, and the like. The mixture of these compounds is vigorously shaken and distilled and the distilled solution is then washed with water to eliminate the remaining inorganic salts. The complex is concentrated to dryness and then dissolved in an appropriate organic solvent. The organic phase is solubilized and then dried on $CaCl_2$. All traces of inorganic salts are eliminated by filtration and the solvent is removed by evaporation.

According to another feature of the invention, it is possible, when it is necessary to obtain certain properties, to use hybrid molecules comprising an inorganic radical such as the first halogens or, more specifically, fluorine, which, as is known, is very commonly used in this type of application in the glass manufacturing field.

The invention also relates to the deposition of all types of metal oxides which are used for deposits produced by pyrolysis inasmuch as they produce stable compounds and their oxides produce layers which are important to the glass industry.

The temperature of the glass product, such as a sheet, during spraying naturally depends upon the particular complex and solvent employed, but it generally will be from about 550° to 640° C. as in conventional procedures.

In this regard, it is known that various precautions must be taken to avoid self-ignition of the product. These precautions can include increasing the air flow and, thus, in reducing the amount of oxide which can be deposited by means of a given solvent ultimately influencing the choice to be effected. From this standpoint, ethyl acetate was found to constitute an excellent compromise. Indeed, acetylacetonate solutions in a toluene-alcohol mixture, for example, literally detonate when the ignition temperature is reached. The ignition temperature of ethyl acetate and, more particularly, heptane, is lower, and, as in the case of the other solvents, it is reduced when the amount of the metal complex is increased but the solution then burns with a harmless gentle flame.

As an example, it has been noted, with an iron charge-transfer complex containing 1.5 AA/1.5 IVA in ethyl acetate, that the self-ignition temperature increases as the complex content decreases; as indicated in Table II below.

TABLE II

| Percentage of Metal | Self-Ignition Temperature |
|---|---|
| 0 (pure solvent) | 412 |
| 2 | 337 |
| 2.5 | 327 |
| 3 | 303 |

The concentration of the complex in solution can vary widely and is largely dependent upon the production conditions, such as glass temperature and speed, and degree and thickness of the semi-reflecting coating desired.

Also, in the complexes, the valences of the metal and radicals are respected as is the coordination number of the metal. Thus, for example, trivalent chromium having a coordination number of 6 will complex with three beta-diketone radicals.

The invention will be further described by the following Examples which are set forth for purposes of illustration only and in which proportions are by weight unless expressly stated to the contrary.

EXAMPLE 1

A chromium charge-transfer complex containing an acetylacetone radical and two isovaleroylacetone radicals was synthesized as previously described. The valence of the chromium was three and its coordination number was 6. This complex was perfectly stable under normal conditions and its metal content was 11.75% by weight. A 3% chromium solution by weight in ethyl acetate was then prepared from this molecule.

This solution was sprayed onto glass as it left a vertical tempering oven at a temperature ranging from 600° to 620° C.

The thus-treated glass had a grey metallic tint when viewed by reflection and a yellowish brown tint when viewed by transmission.

Samples of this glass were subjected to mechanical behavior tests according to the "ASA Z 26.11.966" standard (Abrasion resistance to grinding wheels CS. 10F. load 250 g., on a TABER apparatus).

The results obtained and the properties of the treated glass are summarized in Table III below.

EXAMPLE 2

An iron charge-transfer complex was prepared, as previously described, containing an acetylacetone radical and two isovaleroylacetone radicals. The valence of the iron was 3 and its coordination number was 6. This complex was perfectly stable under normal conditions and its iron content was 12.65% by weight.

The instant complex and that of Example 1 were dissolved in ethanol to give solution having a Cr content of 1.03% and an iron content of 1.09%.

The properties of a glass treated with this solution under the same conditions as those of Example 1 are summarized in Table III below as are the results of the mechanical behavior tests. The deposit has a beautiful homogeneity and perfect reflection.

EXAMPLE 3

A Cr charge-transfer complex was prepared, as previously described, containing two acetylacetone radicals and an isovaleroylacetone radical. The Cr content of this molecule was 13.2% by weight.

Furthermore, an iron charge-transfer complex was prepared, as in Example 2, only containing 1.5 acetylacetone radicals and 1.5 isovaleroylacetone radicals (i.e., an equimolar mixture of AA/2IVA and 2 AA/1 IVA). The iron content was 13.3% by weight.

In both cases, the metal was trivalent and the coordination number was 6.

These two complexes were stable at room temperature, and had the appearance of a viscous tar.

When considered separately, each complex is very weakly soluble in ethyl acetate. On the other hand, they are soluble in that same solvent in each other's presence. However, it is preferable to melt them at approximately 100° C, so as to facilitate their going into solution.

There was thus obtained a solution containing 1.03% of chromium and 1.09% by weight of iron in ethyl acetate. The solution obtained which was filtered in order to remove the fine inorganic particles was quite stable with time.

This solution was deposited onto glass under the same conditions as in Example 1 and its properties and mechanical behavior test results are summarized in Table III below.

EXAMPLE 4

A solution was prepared by dissolving chromium and iron charge-transfer complexes in ethyl acetate as described in Example 3.

(a) the chromium charge-transfer complex contained two acetylacetone and an isovaleroylacetone radical and the chromium content was 13.5% by weight.

(b) the iron charge-transfer complex contained 1.5 acetylacetone radicals and 1.5 isovaleroylacetone radicals. (This is a 50/50 mixture of 2AA/1 IVA and 1 AA/2 IVA; the properties of which are intermediate). The iron content was 13.3% by weight.

In both these cases, the chromium and iron were trivalent and the coordination number was 6.

These two complexes were stable and had the appearance of a viscous tar. It is preferable to melt them at approximately 100° C. so as to facilitate their going into solution.

A solution was obtained containing 1.7% Cr and 1.80% iron in ethyl acetate. The filtered solution was stable.

This solution was continuously sprayed onto 6 mm. blue glass on a float, at a temperature of 550° to 580° C. and the resultant glass tested as in Example 1. The test results and properties of the treated glass are summarized in Table III below.

EXAMPLE 5

The same complexes as in Example 4 were used, but the solvent employed as a 1/1 mixture by volume of ethyl acetate and isopropanol.

The chromium content of the solution was 1.6% by weight and the iron content was 1.8% by weight.

The spraying conditions were the same as those described in Example 4.

The test values obtained and properties of the glass are summarized in Table III below.

EXAMPLE 6

A cobalt charge-transfer complex was prepared, as previously described, containing 1.5 isovaleroylacetone radicals and 1.5 acetylacetone radicals and in which the metal content was 12.8% by weight.

A solution of this complex in ethyl acetate containing 2% by weight of metal was prepared and this solution was deposited onto glass under the same conditions as set forth in Example 1. The test results and properties of the treated glass are summarized in Table III below.

EXAMPLE 7

A titanium charge-transfer complex was prepared, as previously described, containing 2 acetylacetone radicals and 2 chlorine radicals. The valence of the titanium was 4 and the titanium content of the complex was 15.5% by weight.

A solution of this complex in acetone containing 1.8% by weight titanium was prepared and deposited onto glass under the same conditions as set forth in Example 1. The test results and properties of the treated glass are summarized in Table III below.

TABLE III

| Example | Metal (% by Weight) | Proportion AA/IVA | Solvent | Number of 50% TABER Cycles | Energy Reflection | Energy Transmission | Light Reflection | Light Transmission | Solar Factor |
| --- | --- | --- | --- | --- | --- | --- | --- | --- | --- |
| 1 | 3 | 1/2 | Ethyl Acetate | 1,100 | 0.27 | 0.57 | 0.35 | 0.58 | 0.61 |
| 2 | Cr = 1.03 Fe = 1.09 | 1/2 1/2 | Ethanol | 4.070 | 0.26 | 0.52 | 0.34 | 0.46 | 0.57 |
| 3 | Cr = 1.03 Fe = 1.09 | 2/1 1.5/1.5 | Ethyl acetate | 5,700 | 0.24 | 0.54 | 0.32 | 0.49 | 0.60 |
| 4 | Cr = 1.70 Fe = 1.80 | 2/1 1.5/1.5 | Ethyl acetate | 4,450 | 0.29 | 0.32 | 0.37 | 0.34 | 0.42 |
| 5 | Cr = 1.60 Fe = 1.80 | 2/1 1.5/1.5 | Ethyl acetate + Isopropanol | 4,875 | 0.29 | 0.32 | 0.37 | 0.34 | 0.42 |
| 6 | Co = 2.00 | 1.5/1.5 | Ethyl acetate | 4,140 | 0.31 | 0.44 | 0.35 | 0.36 | 0.50 |
| 7 | Ti = 1.80 | Chlorine | Acetone | 3,330 | 0.25 | 0.66 | 0.32 | 0.67 | 0.68 |

While the invention has been described in connection with the preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. The process of producing semi-reflecting glass products by forming a metal oxide coating thereon comprising applying to at least a portion of one surface of said product a solution of at least one charge-transfer complex in a non-aqueous organic solvent therefor, said product having been heated prior to said application to a temperature sufficient to evaporate said solvent and cause pyrolysis of said charge-transfer complex, and said charge-transfer complex having the general formula $MeX_mY_n$ where Me is a polyvalent heavy metal or metalloid, X is at least one beta-diketone radical having no more than 10 carbon atoms, Y is at least one beta-diketone radical having no more than 10 carbon atoms and differing from X; or one of X or Y can be at least one halogen radical, and m and n equal the valence of Me.

2. The process of claim 1 wherein the glass product is a window, X is at least one acetylacetone radical, and Y is at least one $C_6$ to $C_{10}$ beta-diketone radical.

3. The process according to claim 2 wherein the beta-diketone radical is the isovaleroylacetone radical.

4. A process according to claim 3 wherein the metal is trivalent and the radicals comprise an acetylacetone radical and two isovaleroylacetone radicals.

5. A process according to claim 3 wherein the metal is trivalent and the radicals comprise two acetylacetone radicals and an isovaleroylacetone radical.

6. The process according to claim 3 wherein the metal is trivalent and the radicals comprise 1.5 acetylacetone radicals and 1.5 isovaleroylacetone radicals.

7. The process according to claim 1 wherein a mixture of at least two different said complexes is used in solution in a solvent in which each complex, individually, shows little solubility.

8. The process according to claim 1 wherein the metal is chosen in the group comprising titanium, chromium, iron, and cobalt.

9. The process of claim 7 in which two complexes are used, one chromium and the other iron, and the solvent is ethyl acetate.

10. The process of claim 1 wherein the solvent is ethyl acetate.

11. The process of producing semi-reflecting glass products by forming thereon a coating of at least an oxide of a transition element, comprising applying to at least a portion of one surface of said product a solution of at least one charge transfer complex of said element in a non aqueous solvent therefor, said product having been heated prior to said application to a temperature sufficient to evaporate said solvent and cause pyrolysis of said charge transfer complex and said charge transfer complex having the general formula Me $X_m Y_n$, where Me is said transition element, X is a β-diketone, ester or alcohol radical having no more than 10 carbon atoms, Y is a β-diketone, ester or alcohol radical having no more than 10 carbon atoms and differing from X or a halogen radical.

* * * * *